US 6,721,284 B1

(12) United States Patent
Mottishaw et al.

(10) Patent No.: US 6,721,284 B1
(45) Date of Patent: Apr. 13, 2004

(54) GENERATING SERVICE DETAIL RECORDS

(75) Inventors: Peter John Mottishaw, West Lothian (GB); Daniele Abbadessa, Wokingham (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/283,541

(22) Filed: Apr. 1, 1999

(30) Foreign Application Priority Data

Apr. 1, 1998 (EP) ............................................. 98302533
Apr. 15, 1998 (EP) ............................................. 98302903

(51) Int. Cl.[7] ............................................. H04L 12/28
(52) U.S. Cl. ........................ 370/255; 370/352; 370/400; 379/111; 379/114.01
(58) Field of Search .................................. 370/252–257, 370/351–356, 408, 238, 400, 401; 379/111, 114.01, 114.03

(56) References Cited

U.S. PATENT DOCUMENTS

| 5,008,929 A | * | 4/1991 | Olsen et al. ................ 370/524 |
| 5,042,027 A | * | 8/1991 | Takase et al. ................ 340/2.7 |
| 5,592,530 A | * | 1/1997 | Brockman et al. ........... 370/250 |
| 5,905,736 A | * | 5/1999 | Ronen et al. ................ 370/352 |
| 6,064,653 A | * | 5/2000 | Farris ......................... 370/237 |
| 6,137,869 A | * | 10/2000 | Voit et al. ................... 370/238 |
| 6,385,203 B2 | * | 5/2002 | McHale et al. .............. 370/252 |

FOREIGN PATENT DOCUMENTS

| EP | 786883 A1 | 1/1996 |
| WO | WO93/26111 | 6/1992 |
| WO | WO96/38018 | 5/1996 |

OTHER PUBLICATIONS

Thom; "H.323: The Multimedia Communications Standard for Local Area Networks", IEEE Comm. Magazine, pp 52–56, Dec. 1996.*
European Search Report, EP 98 30 2533, Oct. 5, 1998.
Ericsson Review, No. 4, 1997, pp. 142–151, Allan Hansson et al., "Phone Doubler—A Step Towards Integrated Internet and Telephone Communities".

* cited by examiner

Primary Examiner—Dang Ton
Assistant Examiner—Inder Pal Mehra

(57) ABSTRACT

Generalised service detail records are created for a telephony service carried over a packet data network by monitoring packet network service data, signaling data and quality of service data, and combining these data to produce the required service detail records.

22 Claims, 15 Drawing Sheets

GENERATING SERVICE DETAIL RECORDS

Technical Field

This invention relates to methods and apparatus for generating service detail records, and to monitoring systems for collecting data for these records from a network, such as a packet data network, which is used for example to carry multimedia telephony services as described in the International Telecommunication Union's commendation H.323 or the Internet Engineering Task Force's multimedia data and control architecture including the Session Initiation Protocol (SIP). These and similar standards define a set of protocols for establishing sessions or calls which may include one or more users and one or more services, communicating via one or more multimedia channels.

BACKGROUND

The provision of multimedia communications services over a packet data network (PDN) which may not provide quality of service guarantees has recently generated a great deal of interest due to the success of networks based on the internet protocols (TCP/IP). Network operators are currently trialing multimedia communications services over a variety of packet data networks such as Internet Protocol (IP), Frame Relay (FR) and Asynchronous Transfer Mode (ATM). A major problem is to generate service detail records (generalised call data records), in real-time or batch-mode, which measure the service usage of individual users and the service quality that was actually experienced by the user.

DISCLOSURE OF INVENTION

According to one aspect of this invention there is provided a method of generating generalised service detail records for communications (such as telephony) carried over a packet network, comprising the steps of:
  acquiring packet network service data from packets carrying the communications;
  acquiring signalling data from a signalling protocol to identify at least one of addressing, configuration, statue and timing information for endpoints, gatekeepers and connections involved in a call; and
  combining said packet service data and said signalling data to generate service detail records.

According to another aspect of this invention there is provided a method of discovering the network configuration of the endpoints, gatekeepers and their relationships, for a communications service (such as telephony) carried by a PDN, by using a passive monitoring system to capture the signalling messages involved in the configuration and negotiation of relationships, addressing and resource allocation, between endpoints and gatekeepers.

According to a further aspect of this invention there is provided a method of generating generalised service detail records for communications carried over a packet network, comprising the steps of:
  acquiring packet network service data for the packets carrying the communications service;
  acquiring signalling data regarding at least one of call control, registration, admissions, bandwidth management, call status, address translation and intelligent network services;
  acquiring quality of service data for the service transmission level; and
  combining said service data, said signalling data and said quality of service data to generate generalised service detail records.

According to another aspect of this invention there is provided a method of monitoring a packet data sub-network (e.g. ethernet segment) or link (e.g. a T3 link carrying IP over a Point-to-Point Protocol—PPP), comprising the steps of: monitoring at a first location signalling messages to detect the existence of a call; and monitoring at multiple other locations to identify some or all packets associated with the call (in H.323, the Call ID can be used to identify all packets associated with a given call). The captured packets may include both signalling data and data from multimedia streams associated with the call. It may be required for wire-tap applications, for example, to use the signalling data to identify calls of interest, and then capture the entire multimedia stream. It may be necessary to buffer captured packets at each location to ensure that all packets associated with the call could be captured.

In addition, the packets associated with a conference call can be correlated together to form a service record for a conference call. This can be achieved by capturing all packets with the same conference ID in H.323, for example.

In some cases it may be desirable to monitor additional signalling messages, e.g. Signalling System No.7 (SS7) protocol messages or Integrated Services Digital Network (ISDN) messages, on signalling links in a switched circuit network (such as the public switched telephone network—PSTN) coupled to said packet data network, or Media Gateway Control protocol messages (for example MGCP or SGCP) which are used to control the gateway connection between the SCN and the PDN, to derive additional monitoring data, and correlate those additional monitoring data with at least some of first monitoring data. These can be correlated to the original call by using characteristics such as calling or called party numbers to identify the call.

Thus the invention can involve monitoring the control channels used for initiation, modification and termination of multimedia sessions, and may include the monitoring of the multimedia channels themselves, to provide a service detail record for a session.

The invention enables a network operator to generate service detail records on a pure PDN, or on a hybrid network of interconnected PDNs and switched circuit networks SCNs). There is also described a method for automatically discovering the network configuration information, including addressing and identifying the relationships between gatekeepers and endpoints.

BRIEF DESCRIPTION OF DRAWINGS

Methods and apparatus in accordance with this invention for generating telephone service detail records will now be described, by way of example, with reference to the accompanying drawings, in which.

BEST MODE FOR CARRYING OUT THE INVENTION, & INDUSTRIAL APPLICABILITY

Figure 1:
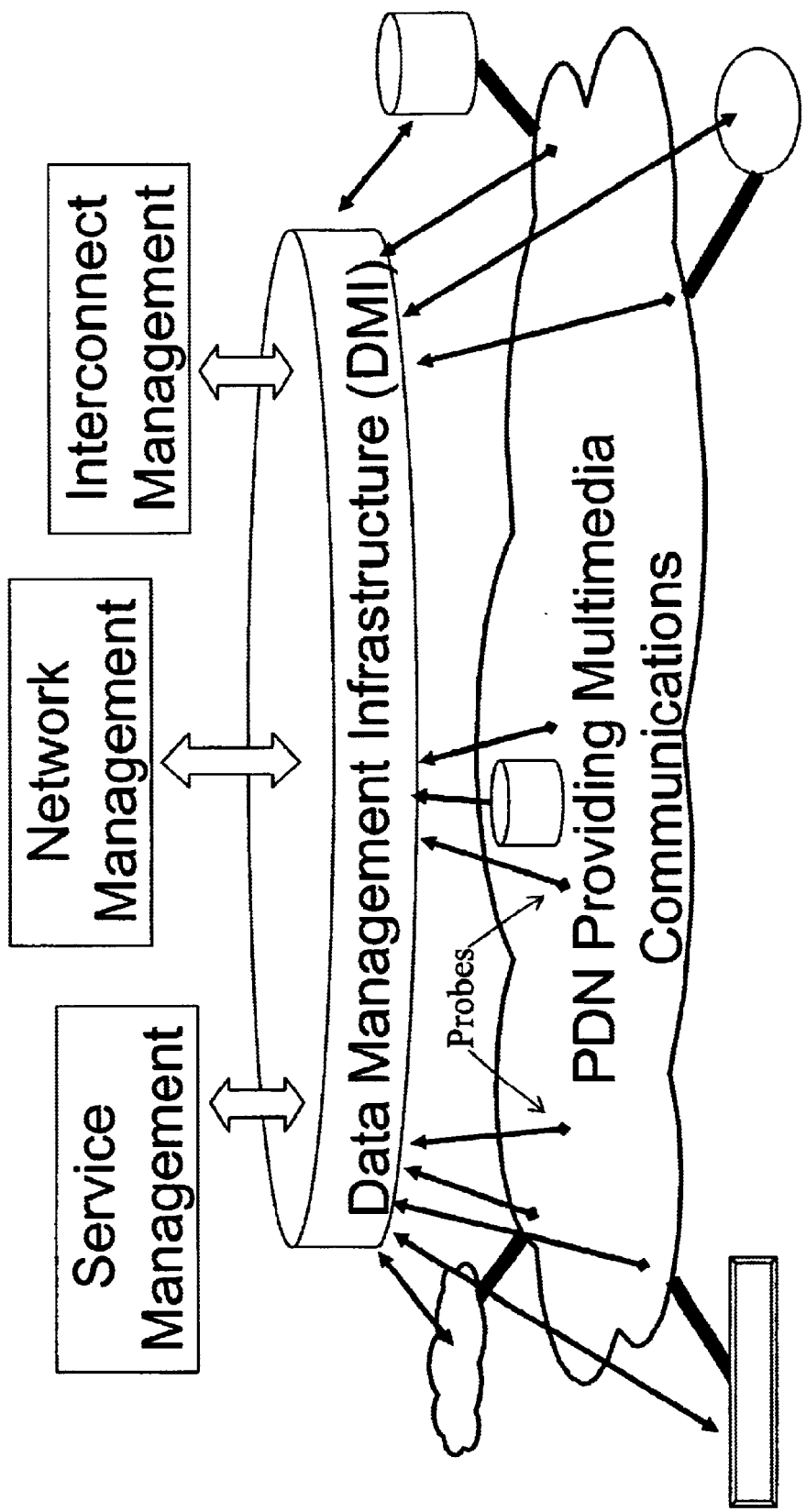
FIG. 1 shows a distributed monitoring system for a PDN carrying multimedia voice services.

The distributed monitoring system shown in the drawings has the capability to collect data from a combined PDN and SCN carrying multimedia services, correlate these data in real-time, and provide a real-time view of services on the network. These data can be used for applications such as troubleshooting, surveillance, security, network planning, provision of accounting information to customers, fraud detection, billing and acquisition of marketing information.

Referring to FIG. 1, the probes shown are part of the distributed monitoring system, and are passive link monitoring devices (using techniques similar to those in existing protocol analysers for example). The distributed monitoring system is constructed from the probes and standard computer and communications components, with special-purpose software which provides the applications described above. A principal function of this software is to correlate data from different probes to provide a record or real-time trace of calls, transactions and other services as they occur on the network. The Hewlett-Packard acceSS7 system is an example of a distributed passive monitoring system which could be used to implement parts of the system described above.

A Data Management Infrastructure (DMI) collects the data from the probes and processes the data to produce service detail records. The DMI may consist of software running oil one or more computers, and the processing of the data and its storage may be distributed across these compute The service detail record generation process may be split between the probes and the DMI. The probes may generate partial service detail records by correlating all the information available on that probe about a particular session, and forwarding those partial records to the DMI. The DMI is then responsible for correlation of partial service detail records from different probes to form the final service detail records. Alternatively the probes can forward uncorrelated data to the DMI, and the DMI is then responsible for generating the complete service detail records. In both cases the DMI is also responsible for the storage of the service detail records and for providing interfaces for application programs to analyse the service detail records. This aspect of the DMI may be implemented using data warehousing technology.

Figure 2:
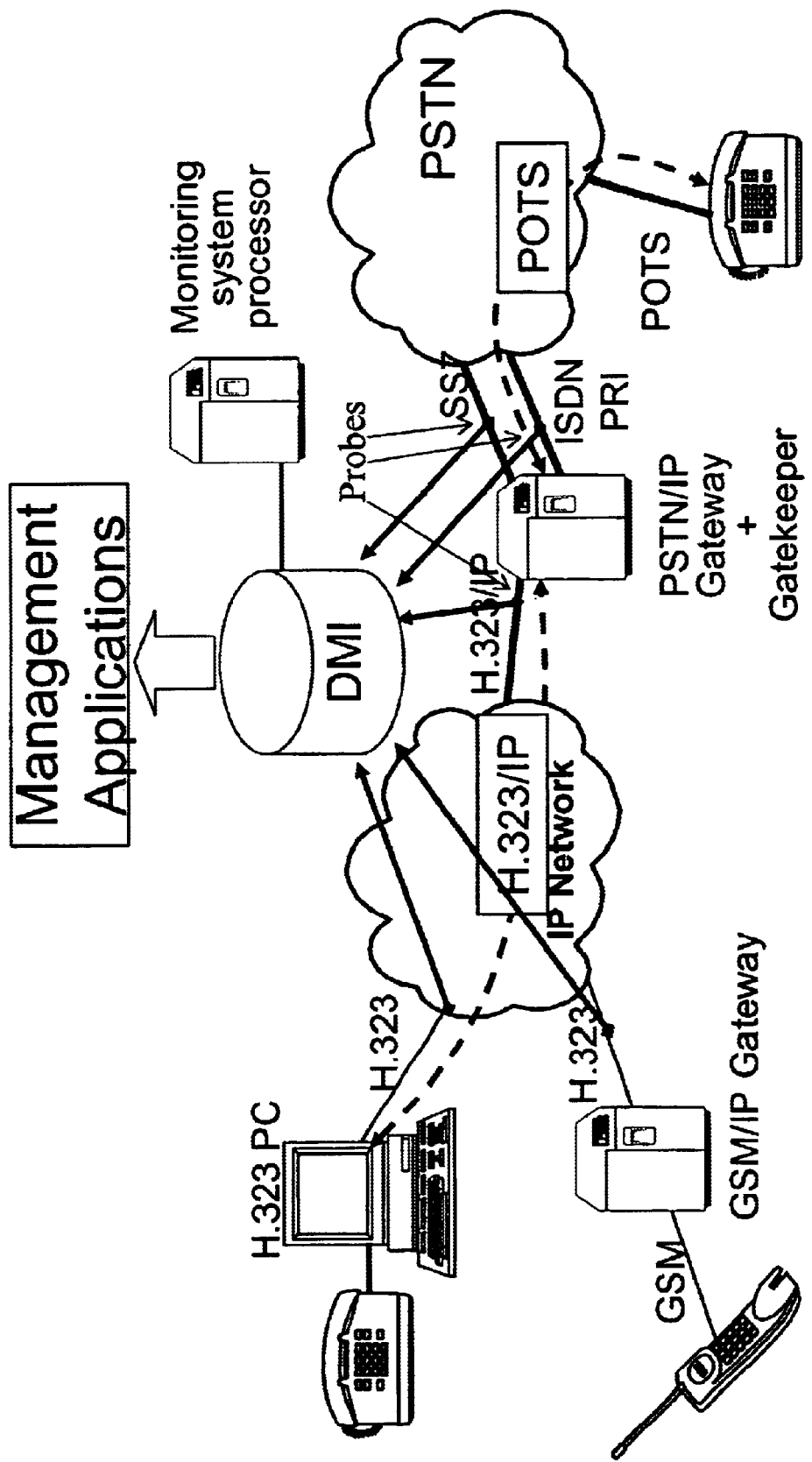
FIG. 2 shows examples of extensions of this architecture to correlate data from the PDN with signalling data from the SCN.

An example of a monitoring system architecture is given in FIG. 2. This shows probes monitoring the PDN, SS7 network and the ISDN. The SS7 probes could be for example from the Hewlett-Packard acceSS7 system. The ISDN primary rate access probes could for example be constructed using the same techniques as in existing protocol analysers (such as the Hewlett-Packard 37900D Signalling Test Set). The PDN probes could be constructed from Hewlett-Packard 4986/7 or 13457/8 LanProbes for example.

The distributed monitoring system is arranged to correlate real-time data from any combination of these probes. This includes, for example, signalling data from the SS7 links, signalling from the ISDN links (e.g. the D-channel for narrowband ISDN), the signalling data for the multimedia service from the PDN, and the multimedia stream data (e.g. data indicating packet loss, latency or jitter). It may also include the capture of the entire multimedia stream for applications like wire tapping or troubleshooting.

For convenience the invention is described primarily with reference to the H.323 recommendation, using IP as the PDN, and optionally connected to one or more SCNs using narrowband ISDN and/or SS7 signalling with trunk connections. However, it should be understood that this terminology is to be taken as including within its scope analogous functionality, whether or not they are customarily identified by the terms used in these standard recommendations.

Auto-discovery Process

The PDN is continuously monitored for packets that provide configuration information on H.323 endpoints and gatekeepers. These packets may be captured to create and maintain a database (the network discovery database) which gives configuration information, addressing information and relationships between the endpoints and gatekeepers. The network discovery database may also take data from additional sources to supplement or verify the captured data. Any discrepancies between the discovered data and the data from other sources should be used to generate an alarm to the network operator indicating a possible network configuration problem. The details of the data captured are described in the following paragraphs.

A type of transaction which is tracked by the monitoring system is the gatekeeper discovery process. This is used by an endpoint to automatically find a gatekeeper which will provide service to it. The monitoring system uses the data captured from the sequence of messages between the endpoint and the gatekeeper, to identify endpoints and gatekeepers and to build a database of the relationships between endpoints and gatekeepers The database stores information derived from the captured data which identifies the endpoint and gatekeeper. This includes the network addresses and port numbers. The monitoring system monitors continuously for endpoint discovery attempts, to maintain an accurate database of the network configuration. This monitoring process is described in more detail below with reference to FIGS. 5 to 8.

The endpoint may go through a registration process with its gatekeeper. This process may be repeated periodically if the registration has a finite lifetime. The monitoring system monitors the network continuously for packets involved in the registration process. The monitoring system captures the relevant packets and uses the data relating to the endpoint and gatekeeper to update and add information to the database. This typically includes any transport addresses (transport address=(Network address, Transport layer Service Access Point (TSAP) or port number)), any alias addresses and any other addressing or configuration information associated with the endpoint or gatekeeper.

Endpoints may also request from a gatekeeper location information for an endpoint for which it has the alias. The monitoring system will continuously monitor for the exchange of packets associated with this location process and capture data from the relevant packets. This data can be used to update or add information to the network discovery database that identifies the relationship between aliases, transport addresses and any other addressing or configuration information. This may include information which identifies how to connect to a destination on the SCN (e.g. E.164 addresses). More details of monitoring of the registration process are given below with reference to FIGS. 9 to 13.

Access tokens may be used to enable an endpoint to hide its transport address from the endpoint to which it is establishing communication. The monitoring system will continuously monitor the network to capture packets that are used in the process of distributing access tokens to endpoints. The captured data is used to add to or update information in the network database indicating the association between an access token and an endpoint.

Generation of Service Records

This section lists the types of fields in service records, and describes how the distributed monitoring system could provide the required data A service record is generated for each instance of the usage of a specific service. This is a generalisation of a call record, which is generated by current switches. A service is normally defined from the perspective of the user. The service may actually involve a number of calls or transactions, for example. In the case where only the PDN is being monitored, these service records include data from the signalling between any combination of gateways, gatekeepers, terminals and multi-point controllers; and data from the multimedia streams controlled by this signalling. In the case where the SCNs connected to the PDN am being monitored, the service record will also include data from the signalling data on the SCN collected from the probes connected to the SCN. The network discovery database may be used in constructing the service records to fill any address or configuration information which is not available directly from the packets involved in the call.

Figure 3:
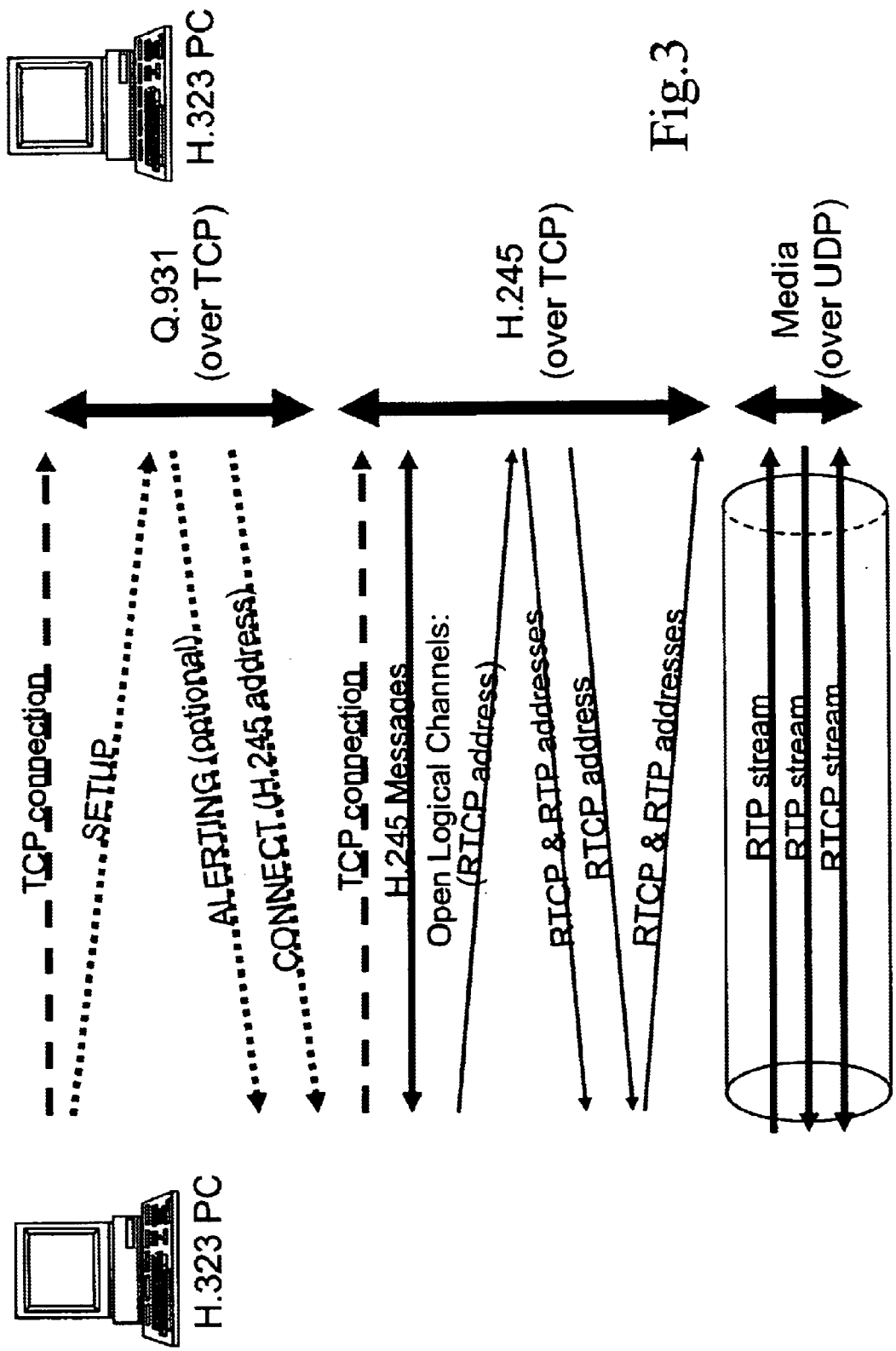
FIG. 3 shows the sequence of message types which can be captured to construct a service detail record.
Figure 4:
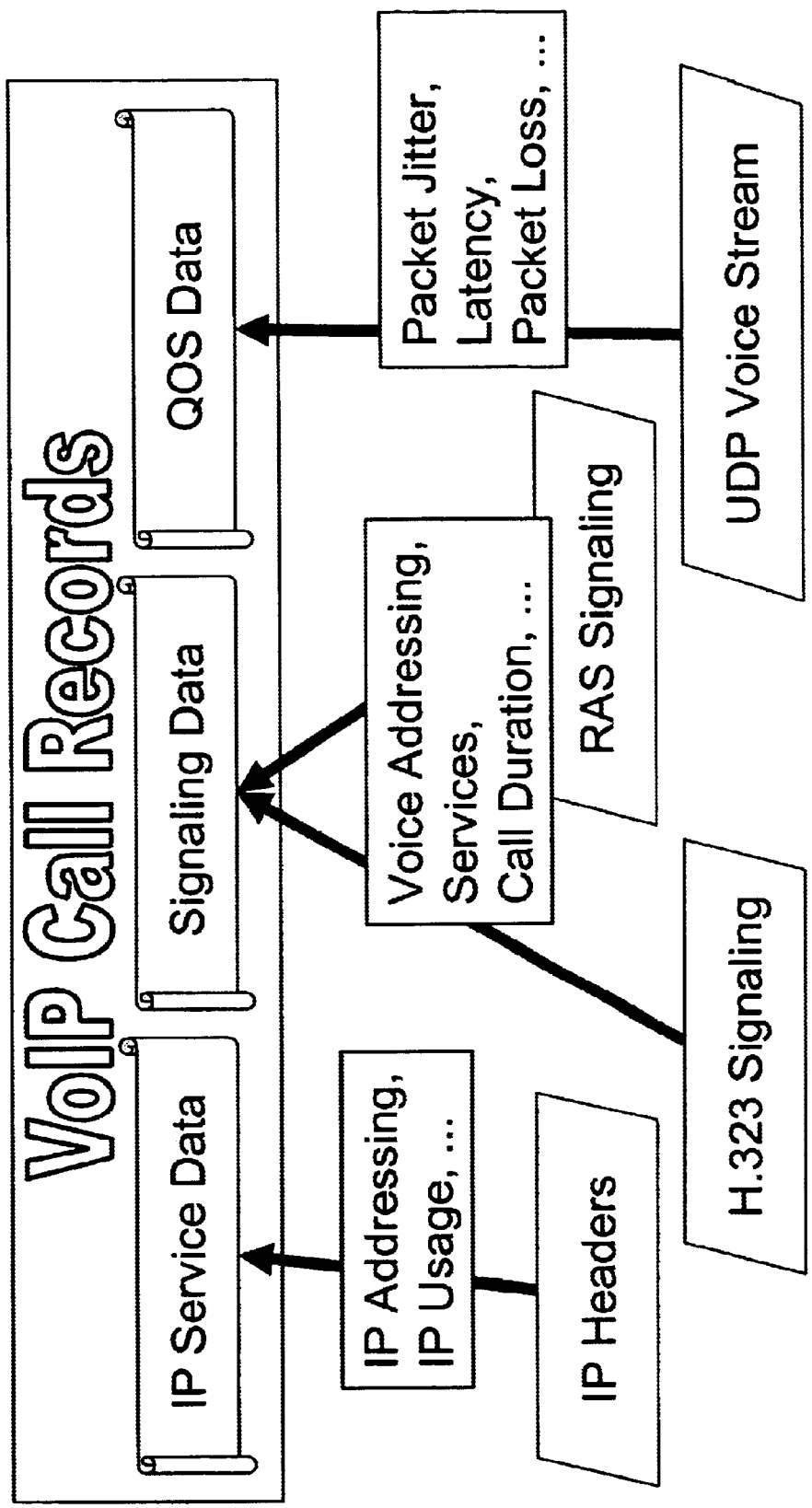
FIG. 4 shows an example of the structure of a service record that could be constructed from the data collected by the monitoring system.

FIG. 3 shows an example of the sequence of packets which may be captured at different levels in the overall stack of protocols (such as Q.931, II.245 and an unreliable datagram protocol—UDP) to provide a service detail record FIG. 4 illustrates how the information from these different parts of the overall transaction can be used to contribute to different respective parts of a service detail record.

1. Calling Party Information.

This includes any information which can be derived about the calling party from the signalling data flowing on the PDN, and is therefore available to the link monitoring probes. Typical information includes: calling party number; any ISDN sub-addressing information; calling party name; network addresses; TSAP or port numbers; alias addresses; and any numbers or addresses related to billing. This information can be derived from the sequence of messages used to setup a call. In the H.323 recommendation, this can be achieved by extracting the relevant fields from the Q.931 messages used in setting up the call (set-up, call proceeding, alerting, connect for example). In the cases where one or more gatekeepers are involved the admission signalling (H.225 ARQ and ACF messages for example) between gatekeeper and endpoint is captured to identify the logical channel for call signalling. The logical channel is typically identified using the transport address.

Additional information may be derived from call setup messages on the ISDN D channels of an interconnected SCN, at either the originating or terminating end or both; and/or from call setup messages on any of the SS7 links of the SCN. Additional information may also be derived from any intelligent network service messages that flow over the SS7 links as part of the specific service usage.

2. Called Party Information.

As for calling party information, but replace calling party by called party.

3. Information on each party in a conference.

The equivalent data to the calling party information for each party in a conference, with additional information on the conference objective (join conference, create conference or invite for example) and a means to identify the conference (Conference ID for example).

4. Network Routing and Logical Channel Information.

This may include any information on the network resources which were used to provide this specific service usage. The following are examples of data which might be provided:

- logical channels associated with the call and their identifiers,
- the requested media, codecs (coder/decoders), service quality and bandwidth for each channel,
- the negotiated media, codecs, service quality and bandwidth for each channel,
- any other performance or configuration data on the channels which are requested or established during the call or conference.

Each of these uses is time-stamped, and the sequence and nature of the use indicated. These data can be obtained in a similar way as was described for item 1 above from the capture of packets carrying signalling information. More specifically the logical channels can be identified by using the fields within an OpenLogicalChannel structure within certain messages defined in H.323 and associated recommendations. Subsequent messages which control the logical channels are also monitored and any changes in channel configuration can be time stamped and added to the service record.

A important additional set of information is the measured quality of service and bandwidth usage on each of the logical channels set-up as part of the call. This will typically include packet loss rates, latency and jitter measurements which are made over selected intervals by capturing packets from the logical channels and extracting the relevant fields.

5. Supplementary Services Information.

This may include any information on supplementary services used for this specific service usage. The following are some examples of the data which may be provided:

- call forwarding indication and address information;
- interactive voice response information on the use of intelligent peripherals;
- 800 number services;
- any custom services that may be invoked during the call or conference.

This information includes time-stamps, duration and the nature of the use. These data can be obtained in a similar way as was described for item 1 above.

6. Service Status and Term on Information.

This may include time-stamped information on the initiation of the service, time-stamped information on any status changes occurring during service and time-stamped information on the termination of the service. The termination information should include the reasons for termination.

These data can be obtained in a similar way as was described for item 1 above. In particular, the H.245 endSessionCommand message and the Q.931 call termination messages, the call clearing messages on the SS7 links and the ISDN D channels can provide details on the reasons for call termination.

7. Additional Service Quality Information.

The service quality information provided is dependent on the service indicated in the service type field. The following gives some examples of what can be provided for specific services.

Voice quality is mainly indicated by the bit error rate, jitter and delay. These parameters can be measured using a passive monitoring system and monitoring at two points in the network. Signalling information can be used to identify the logical channels on the PDN, the ISDN B channels or the time slots on SCN trunks, that are carrying the voice signals. The bit streams from each of the channels or trunk time slots identified can be compared to derive the delay, jitter and bit error rate caused by the intermediate networks.

8. Service Usage Information.

The type of usage data provided by the distributed monitoring system depends on the specific service. Some examples follow.

Voice, video and fax services require call duration and used bandwidth.

The data oriented services require data such as total bits, frames and packets in each direction. This may be provided for regular time intervals for the duration of the service. It may also be broken down into a traffic matrix, where the data protocol has additional addressing information (such as IP addresses). The data are obtained in a similar way as is described for item 1 above.

9. Security Information.

A particular instance of service usage may be an attempt to obtain unauthorised access to resources. The service record includes information which may indicate this type of behaviour. This may include information about the duration of call, the way the call was terminated and details of the service used.

An example would be where there are repeated failed attempts to gain access to different resources.

Real-time Updates on Service Use

The data that populates the service records described in the previous section can be collected in real-time from the monitoring probes. These data can be provided in real-time on remotely connected computers, as they become available. A user of the distributed monitoring system can apply filtering criteria on any of the information described in the previous section, to select those instances of service use for which real-time updates are required.

Wire-tap Capability

Any of the data extracted from the signaling messages can be used to match criteria set by the user of the monitoring system and trigger some or all of the logical channels to be captured in their entirety. This technique can be used to provide a wire-tap capability, which would allow real-time copies of the media streams to be routed through the monitoring system to a thud party, or stored for analysis. The filtering could also be on characteristics in the media stream (for example, a specific spoken word in an audio stream) which, if matched, would trigger the capture of all the service record information from the signalling messages, as described earlier.

Applications

The following applications can be implemented using the data from the service records described above or the real-time service updates. Data from other sources may be used to enhance the effectiveness of these applications.

A. Quality of Service and Service Level Agreements.

The service records described above can be used to provide service quality information on selected customer's service. This can be used to track conformance to service level agreements, and be provided to the customer as an additional service. It can be provided as periodic reports, or in real-time using the real-time updates described above.

B. Surveillance and Troubleshooting for Network Operations.

The service records and real-time updates can be used to identify service or network faults. The information can also be used to troubleshoot the faults.

C. Fraud Detection.

The service records and real-time updates can be used to identify potential fraudulent use of the network or service. Indications may include excessive use of high value services, unusual call termination behaviour and repeated failures to gain access to a service. The distributed monitoring system may be used to track the service usage of potential high-risk users in real-time.

D. Security and Hacking Detection

Potential security threats can be identified by repeated failures to gain access to a service. They also may be indicated by successful access to sensitive services, such as maintenance ports on customer premises equipment (CPE). This type of data is available from the service records and the real-time updates.

E. Billing Data

The service records can be used as a basis for billing which is dependent on any of the fields in the service record. This allows, for example, billing to be based on the actual service quality delivered It also enables billing to reflect the nature and generation of the usage of resources on the network, such as intelligent peripherals and databases. The billing data could be made available in real-time.

F. Customer Accounting Data

The detailed service usage information in the service records can be provided to customers for use in their internal accounting. This includes the traffic matrix information for packet and fame based protocols, which the system derives from the B and D ISDN channels.

G. Customer and Telecom Operator Network Planning

The service records can provide detailed information on the use of network resources which can be provided to network planning departments within the operator and the customer.

H. Wire-tap

The wire-tap capability described above can be used to provide wire tap services to authorized third parties, and potentially as a trouble shooting tool.

Monitoring of H.323 Gatekeeper Discovery Transactions

As noted above, the gatekeeper discovery process is the process an endpoint uses to determine which H.323 gatekeeper to register with. The process can be performed manually or automatically Manual discovery relies on information provided independently to the endpoint, and analysis of the endpoint registration procedure in this case can be used to identify inconsistencies in the available information.

The discovery process starts when an endpoint multicasts a Gatekeeper Request message (GRQ) to a predetermined address (Discovery Multicast Address). On receipt of such a message a gatekeeper can either accept (Gatekeeper Confirmation message—GCF) or reject (Gatekeeper Reject message—GRJ) the request.

If several gatekeepers responds positively with GCF messages to the GRQ message, the endpoint is free to choose among them arbitrarily. In this case, analysis of the choice of gatekeeper can usefully reveal if a suitable choice was made, or it can be used to verify assignment policies set by system managers. Analysis of the list of alternative gatekeepers is also worthwhile since it can provide information about network redundancy.

Rejection messages and no-answers to GRQ messages are valuable since they enable verification of assignment policies as well as investigation of problems related to multicasting.

Monitoring of the gatekeeper autodiscovery procedure is in this embodiment split into two processes:

Dispatcher process (FIG. 5); and

Figure 6:
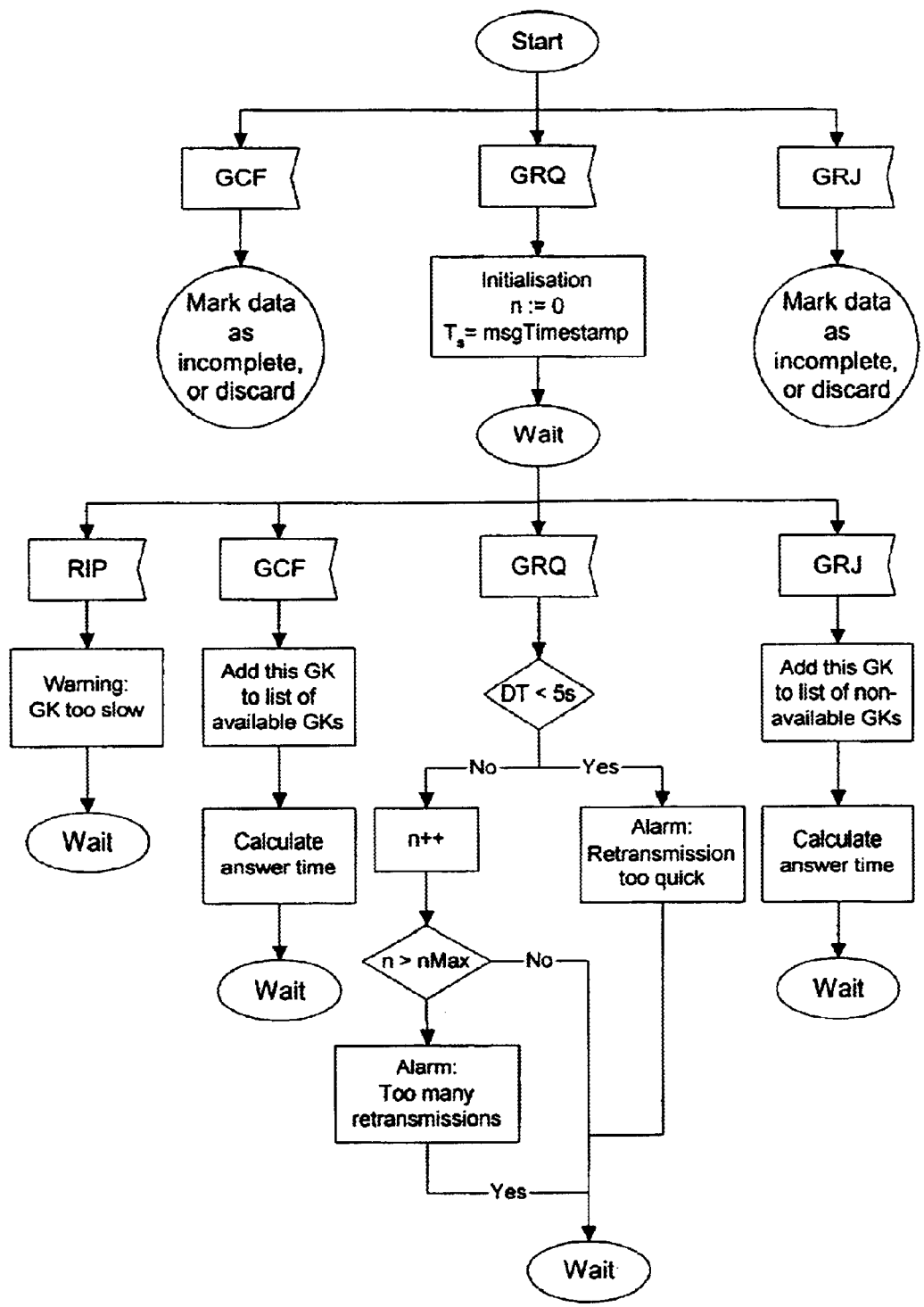
FIG. 6 is a flow diagram of a process for extracting data from gatekeeper auto-discovery messages.

SigProcessing process (FIG. 6).

Figure 5:
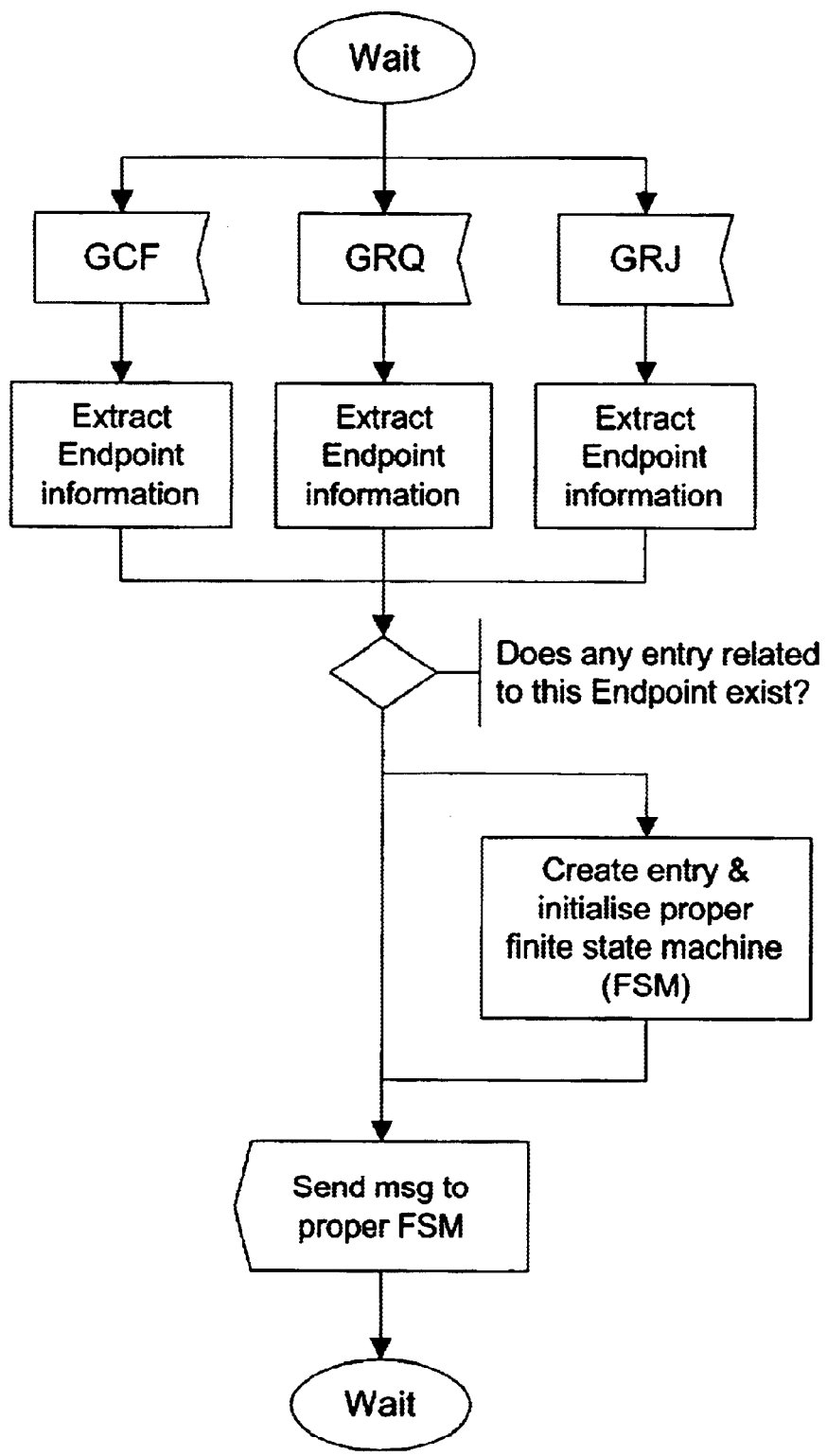
FIG. 5 is a flow diagram of a process for monitoring signalling messages related to gatekeeper auto-discovery.
Figure 7:
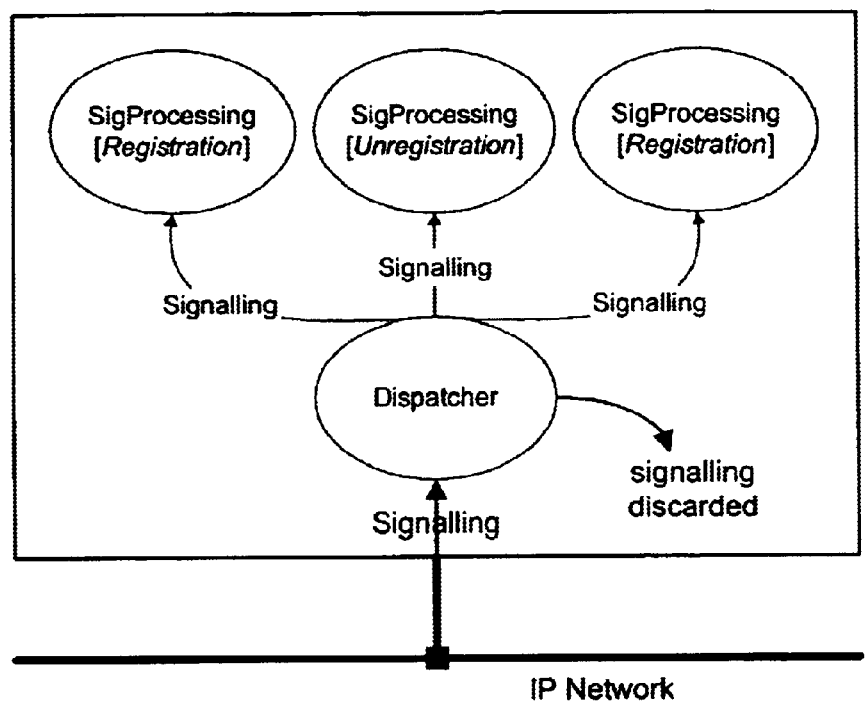
FIG. 7 shows the relationship between the processes of FIGS. 5 and 6.

Referring to FIG. 5, the Dispatcher process collects all the GRQ, GCF and GRJ signalling messages detected by the link monitoring probes and determines the endpoint to which each refers. Then, as illustrated in FIG. 7, the messages are dispatched to an appropriate SigProcessing finite state machine (FSM) process which coordinates assembly of the data necessary to assess the gatekeeper auto-discovery procedure in relation to a specific endpoint. There need be only a single instance of the Dispatcher process, but several SigProcessing processes can be active at the same time.

Referring to the state definition language (SDL) chart in FIG. 6, the SigProcessing process consists of an FSM which keeps track of the evolution of the gatekeeper autodiscovery process for a specific endpoint For the sake of clarity and simplicity, the chart has been designed with the assumption that the monitoring system is installed before endpoints start the gatekeeper discovery process. In practice some endpoints might already be in the middle of the gatekeeper discovery process when the monitoring system is first installed. In this case a CTCF or GRJ message is the first to be received in respect of such an endpoint, and the behaviour of the FSM shown in FIG. 6 may be determined at the discretion of the system operator incomplete information may be collected or, alternatively, the signalling information involved may be discarded.

In relation to an endpoint, the measurements that can be collected and used to assess the overall gatekeeper autodiscovery process include:

list of available gatekeepers (derived from GCF messages time-stamped and ordered);

list of gatekeepers that rejected the GRQ request (derived from GRJ messages time-stamped and ordered);

list of alternative gatekeepers;

alarms (no answers to GRQ messages; GRQ retransmissions too quick or too numerous);

warnings (RIP messages, i.e. gatekeepers too slow to answer).

The $1^{st}$ GRQ and the GCF or GRJ can be time-stamped and statistics about response times can be derived.

Similar statistics can be also obtained for discovery process performance from the point of view of gatekeepers.

Figure 8:
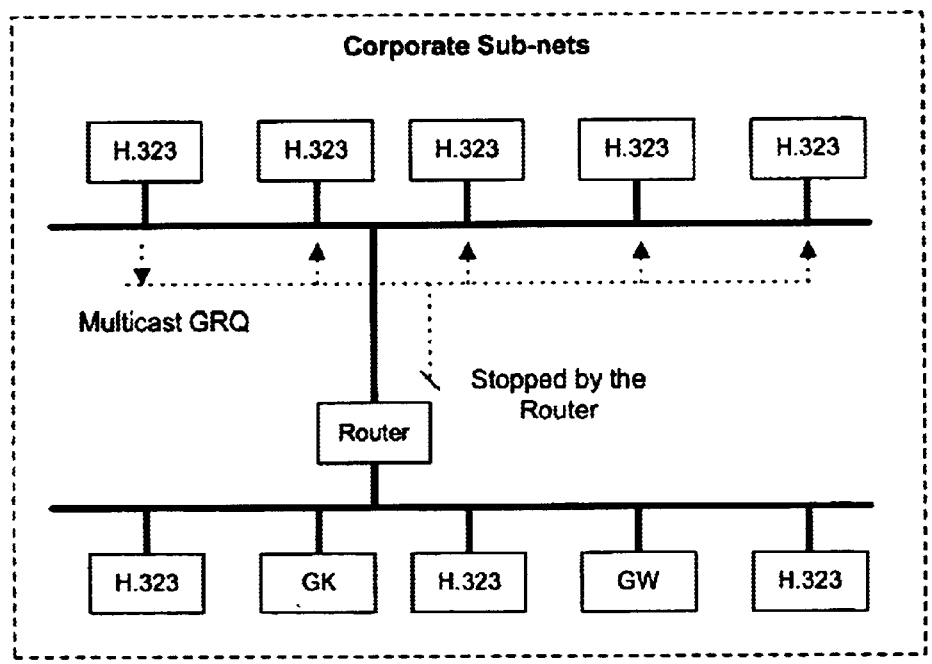
FIG. 8 illustrates a failure mode which can affect the gatekeeper auto-discovery procedure.
Figure 9:
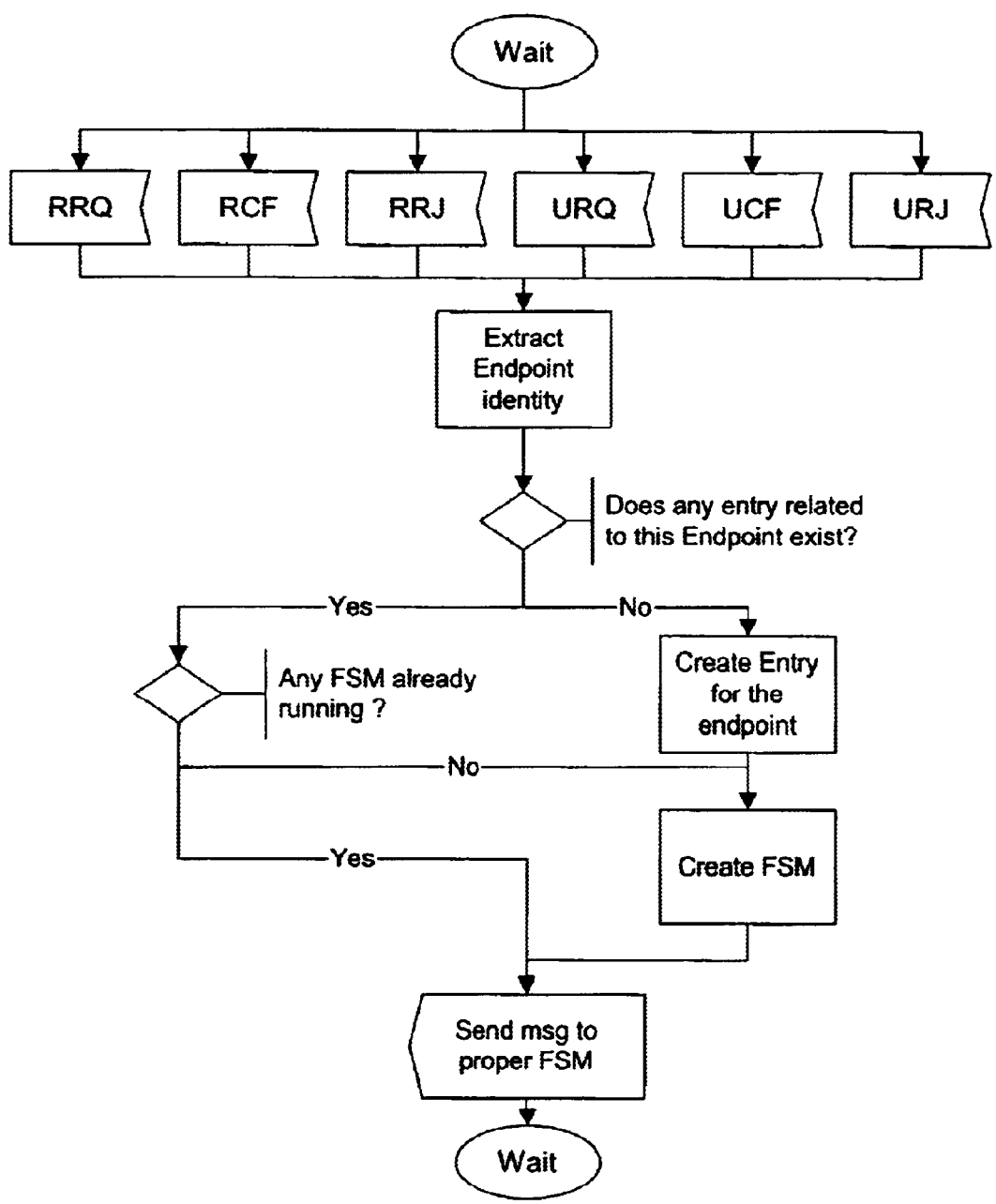
FIG. 9 is a flow diagram of a process for monitoring signalling messages related to registration of endpoints with gatekeepers.

The case of endpoints that do not receive any answer to their GRQs can be worthy of study. Two causes can be identified for this behaviour; GRQs may be seat to a multicast address different from the predetermined Discovery Multicast Address, revealing mis-configuration at the endpoint; or, as shown in FIG. 8, there may be configuration problems within a router causing the router to fail to forward multicast requests from one sub-net to another. Clearly there is also the possibility of network disruption that occurred at the time an endpoint initiated the gatekeeper discovery procedure. For this reason it is important to keep a record of timing information since it allows later correlation with other network events.

The signalling messages involved in the gatekeeper discovery procedure and, in particular, the fields carrying key data for monitoring this procedure, are summarized below. This summary focuses on the essential fields, though more data can be extracted if desired from the signalling messages in order to provide more complete information about the overall gatekeeper discovery process.

Gatekeeper Request (GRQ)

reqSeqNum. This allows correlation with subsequent signalling (GCF and GRJ messages) originated in response to this request.

rasAddress. Transport address of the endpoint (Registration, Admission and Status—RAS—channel).

endpointType. This identifies the type of endpoint (useful for consistency checks).

gatekeeperIdentifier. This should be empty. Otherwise, it contains the identifier of the gatekeeper the endpoint is interested in registering with.

Gatekeeper Confirmation (GCF)

reqSeqNum. Must be the same as in the corresponding GRQ message.

gatekeeperIdentifier. This identifies the gatekeeper that is sending the GCF.

rasAddress. Transport address used by the gatekeeper for registration and status messages.

alternateGatekeeper. Prioritised sequence of alternative gatekeepers and related RAS addresses.

Gatekeeper Reject (GRJ)

reqSeqNum. Must be the same as in the corresponding GRQ message.

gatekeeperIdentifier. This identifies the gatekeeper that is sending the GRJ.

rejectReason. Cause code related to this rejection.

alternateGatekeeper. Prioritised sequence of alternative gatekeepers and related RAS addresses.

altGKisPermanent. This indicates if future RAS messages should be rejected to the alternative gatekeepers or not.

Monitoring of Endpoint Registration

The endpoint registration procedure is complementary to the gatekeeper discovery procedure, and enables an endpoint to join a "zone" managed by a chosen gatekeeper and inform the gatekeeper of its Transport Address and Alias addresses. Monitoring of this procedure enables the zone managed by one gatekeeper to be independently determined. It also allows correlation of the information gathered during monitoring of the gatekeeper discovery procedure in order to assess the choice of specific gatekeeper by an endpoint.

Registration is mandatory and must be done before any call is attempted. Furthermore, it may occur periodically according to the gatekeeper's policy. It might happen that the frequency of the registration process is very low and that therefore signalling related to the registration process is rarely captured. As an alternative monitoring of the admission procedure (eg. according to recommendation H.225) can be used to create similar information to that gathered through monitoring of the registration process.

The registration process involves only three signalling messages; usually it follows the gatekeeper discovery process. An endpoint sends a Registration Request message (RRQ) to a gatekeeper, using the gatekeeper's RAS address, which is known from the previous gatekeeper discovery process. On receipt of such a message the gatekeeper can either accept or reject the request and replies with a Registration Confirmation (RCF) or Registration Reject (RRJ) message, respectively. Reasons for rejection of the registration can include ambiguous registrations and security issues.

The registration process can be periodically repeated since each registration may have a file life. Moreover, updates in an endpoint's Transport Addresses and/or Alias addresses are notified through new registrations.

Closely related to the registration process is the unregistration process, by which and endpoint and a gatekeeper cancel the relationship which exists between them. Either an endpoint or a gatekeeper can initiate it. It also consists of three messages. The Unregister Request (URQ) message triggers the procedure. If initiated by a gatekeeper the endpoint has to acknowledge it by replying with an Unregister Confirmation (LCF) message. If initiated by an endpoint the gatekeeper might reply with an Unregister Reject message (URJ). This might be due to the fact that the endpoint was not in fact previously registered with this gatekeeper. The unregistration procedure may or may not he invoked before a re-registration.

A gatekeeper must keep a one-to-one mapping between Transport and Alias addresses. Changes of both Transport and Alias addresses at once can occur and they should be preceded by use of the registration procedure.

Monitoring of the registration procedure is valuable for several reasons. It can provide information needed to define zones and provide a mapping between Transport Addresses and Aliases. Furthermore, security policies can be monitored and verified and, eventually, fraud or fraud attempts discovered. Gatekeeper load balance can also be usefully analysed. Finally, mapping of the endpoints that belong to a zone in conjunction with depiction of the physical representation of the network topology (e.g. derived using auto-discovery facilities in the Hewlett-Packard OpenView network management tool) can be extremely useful to identify network problems such as connectivity bottlenecks or unsuitable gatekeeper choices.

As mentioned earlier, the admission procedure can be used similarly to the registration procedure to generate data about the zone discovery. In this case, algorithms similar to those described herein can be used by replacing RRQ with ARQ, RCF with ACF and RR with ARJ, respectively.

Figure 10:
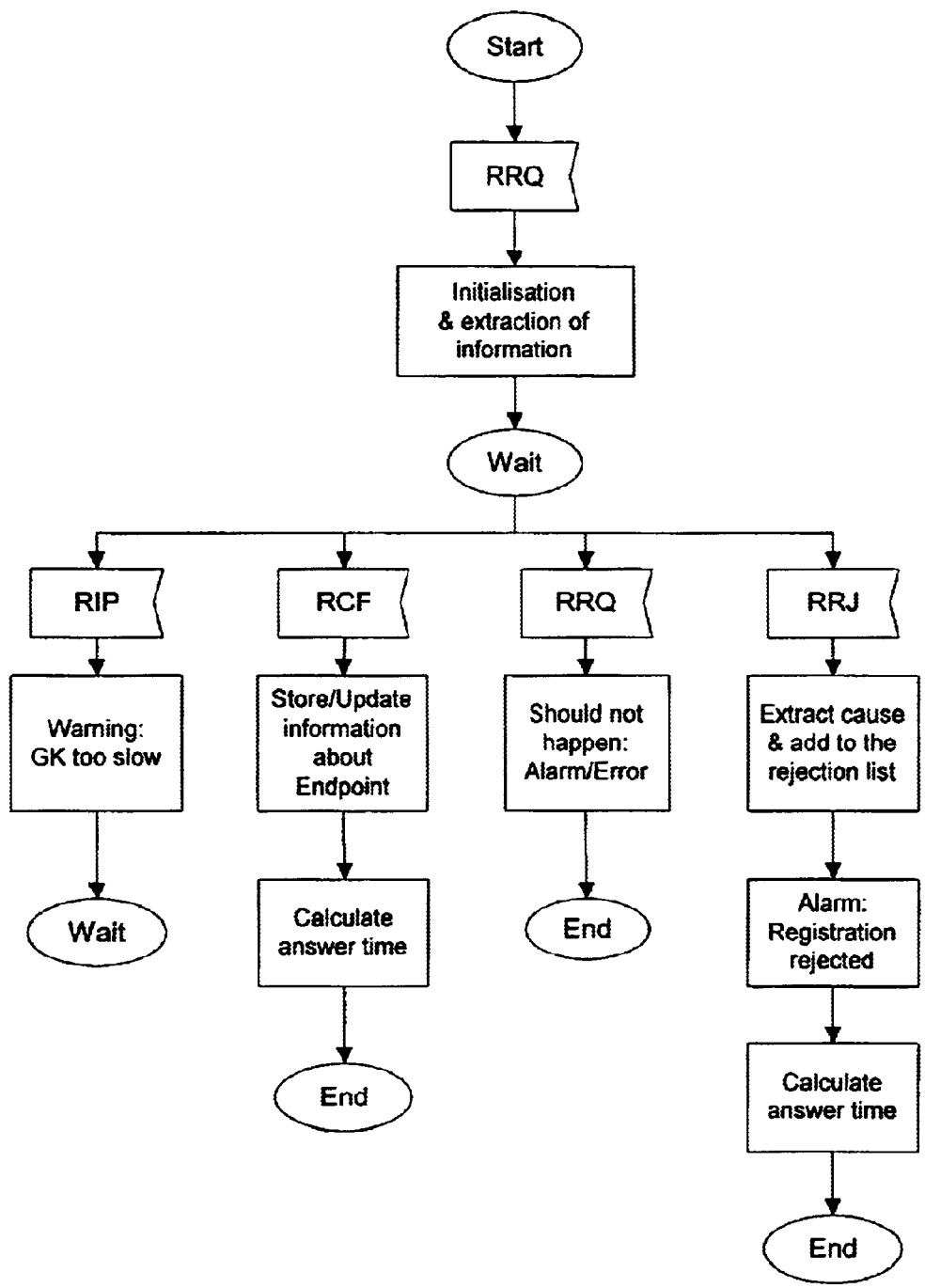
FIG. 10 is a flow diagram of a process for extracting data from endpoint registration messages.
Figure 11:
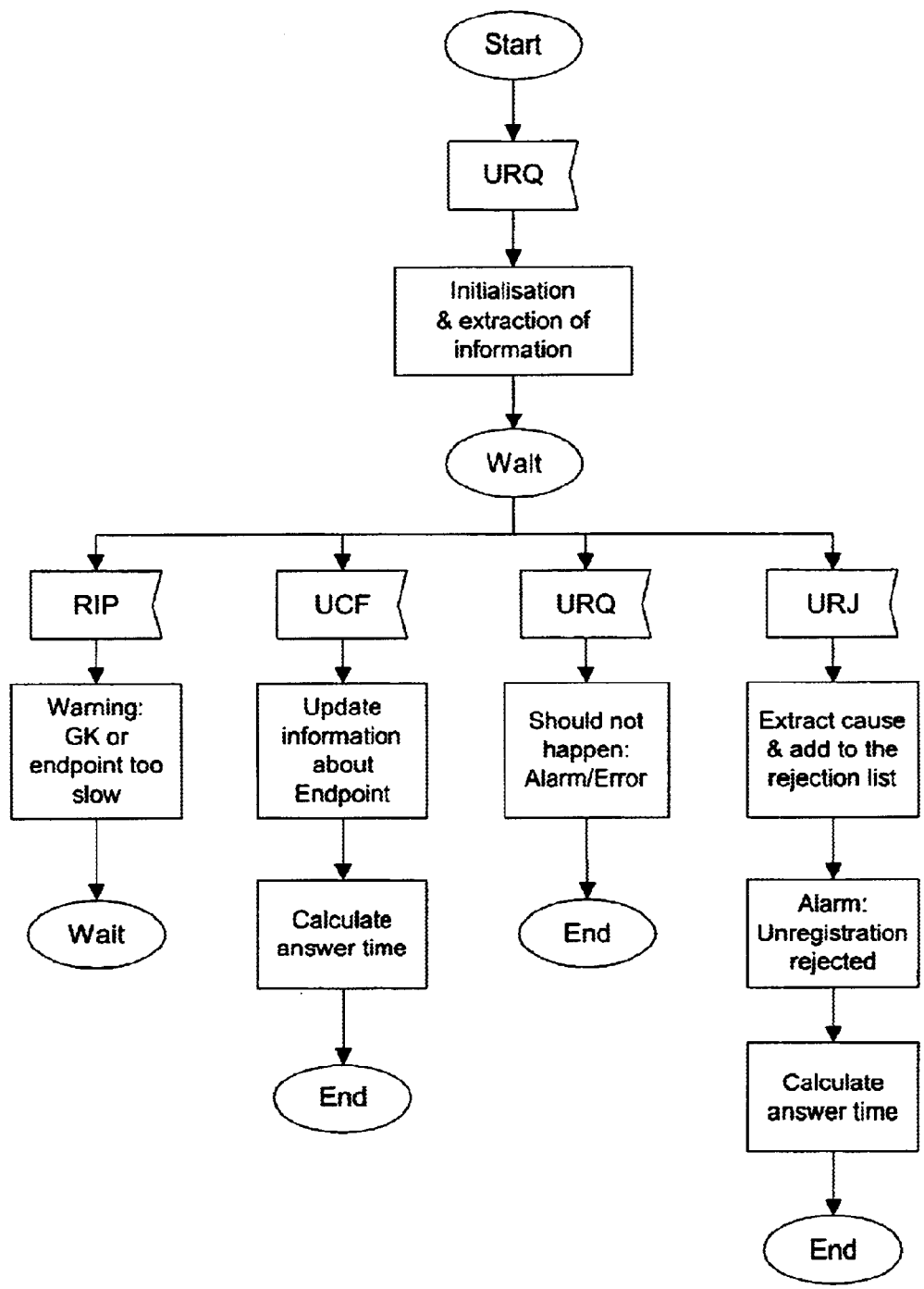
FIG. 11 is a flow diagram of a process for extracting data from endpoint unregistration messages.

Processing of the registration and unregistration signalling is split into two. A first Dispatcher process (shown in FIG. 9) recogniser if any of the registration or unregistration messages that are captured refers to any endpoint already registered or in the process of doing so. As illustrated by reference again to FIG. 7, the Dispatcher process also dispatches the signalling message to one of two SigProcessing processes which extract the data necessary for zone discovery. SDL charts for these two processes are shown in FIG. 10 (registration) and FIG. 11 (unregistration), respectively.

The measurements that can be collected in this way and used to generate data about zones include:

endpoint⇆gatekeeper relationship (dynamic relationship);

Transport Address⇆Alias Address correspondence (dynamic relationship);

gatekeeper load balance;

alarms (no answers to request messages);

warnings (RIP messages, i.e. gatekeepers too slow to answer);

mapping of a zone over the physical network topology;

assessment of the choice by endpoints of the gatekeeper to register with;

analysis of rejections of registration and unregistration attempts.

The endpoint-gatekeeper relationship is a temporal relationship which has a related start and end time. Similarly, the identification of endpoints through Alias and Transport Addresses is dynamic and it must be associated with timestamps. Consistency checks should preferably be carried out to verify that a unique mapping exists between an Alias Address and the related Transport Address.

It is possible to highlight cases of endpoints that do not receive any answer to RRQ or URQ messages. This might be due, for example, to the use of an incorrect gatekeeper RAS address. The information gathered about the registration procedure can be used to assess the choice of gatekeeper with which endpoints register and, ultimately, to determine abnormal configurations.

Figure 12:
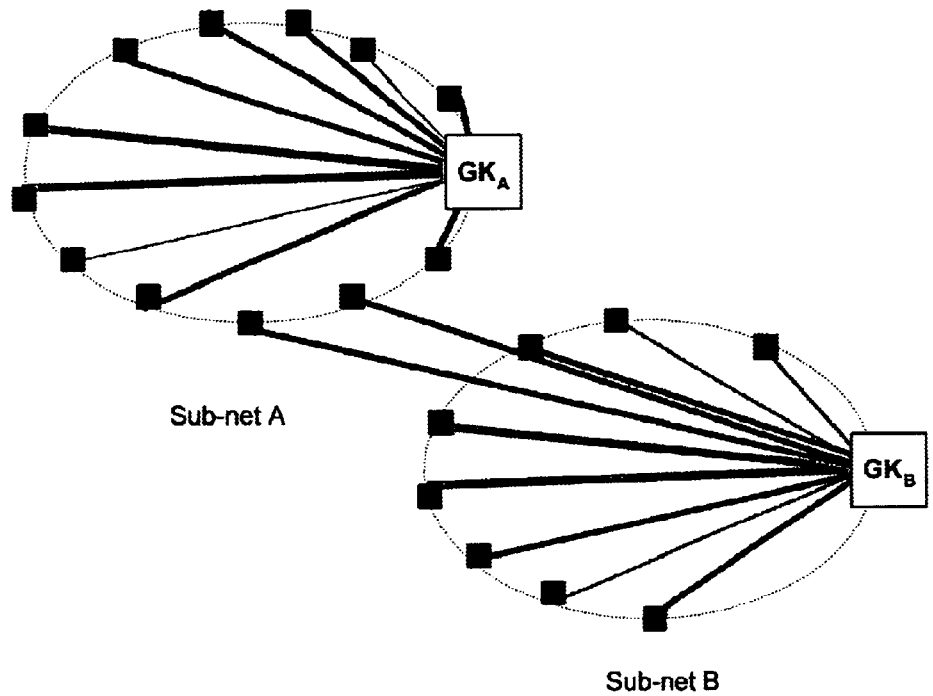
FIG. 12 illustrates potentially anomalous registration of endpoints with a gatekeeper in a different sub-net.

Moreover, it is useful to map zones relative to physical network topologies. For example, FIG. 12 shows two subnets, each with a gatekeeper and several endpoints. More specifically, two endpoints in the sub-net A are registered with a gatekeeper $GK_B$ that is associated with another sub-net, sub-net B. This may be a desirable behaviour justified by gatekeeper load balancing policies. However, it might also be anomalous behaviour.

Figure 13:
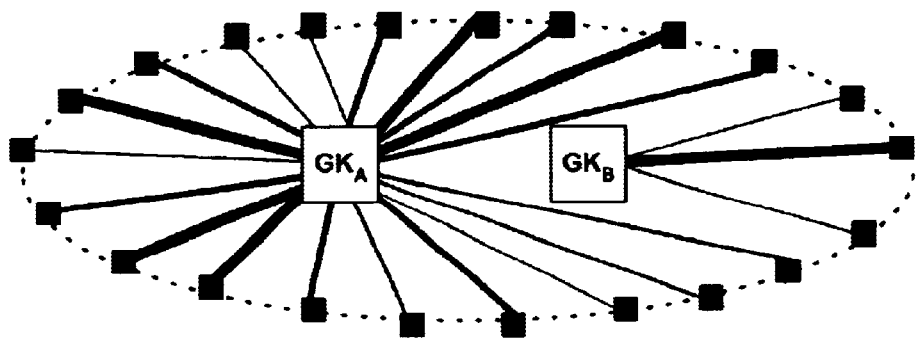
FIG. 13 illustrates potentially anomalous load imbalance between two gatekeepers in a sub-net.

With regard to gatekeeper load balance, FIG. 13 shows schematically the traffic between the endpoints and the gatekeepers on the same sub-net. Clearly load imbalance exists between the two gatekeepers. As in the previous case, this may be a desirable behaviour. But it might also reveal the existence of a situation that does not match the desired policy put in place by the system administrator.

Rejection messages, such as RRJ or URJ, can be useful to highlight either configuration or security related problems, e.g. fraud attempts.

The signalling messages involved in the registration and unregistration procedure and, in particular, the fields that carry the key data for the monitoring of these procedures, are summarized below:

Registration Request (RRQ)

requestSeqNum. Monotonically increasing number unique to the sender.

discoveryComplete. Set to TRITE if the registration follows the gatekeeper discovery process. It could happen that when a registration ages, the gatekeeper discovery has to be invoked before attempting a new registration. This is one possible reason for rejecting an RRQ or ARQ.

callSignalAddress. Call signalling address for the endpoint.

rasAddress. Transport address of the endpoint (RAS channel).

terminalType. This identifies the type of endpoint (useful for consistency checks).

terminalAlias. This should be empty. Otherwise, it contains a list of Aliases to identify the endpoint.

Gatekeeperidentifier. The gatekeeper with which the terminal wishes to register.

alternateEndpoints. A sequence of endpoint alternatives for CallSignallingAddress, rasAddress, termninalType, or terminalAlias.

Registration Confirmation (RCF)

requestSeqNum. Same value as for the RRQ.

callSignalAddress. Transport Addresses for H.255.0 signalling.

terminalAlias. A list of Alias Addresses assigned by the gatekeeper by which other terminals identify the endpoint.

GatekeeperIdentifier. The gatekeeper that has accepted the endpoint registration.

timeToLive. Duration of the validity of the registration.

preGrantedARQ. Special pre-granted permission to make phone calls.

Registration Reject (RRJ)

requestSeqNum Same value as for the RRQ.

rejectReason. The reason for the rejection of the registration.

GatekeeperIdentifier. The gatekeeper that has rejected the endpoint registration.

alternateGatekeeper. Sequence of prioritised alternative gatekeepers with which to retry requests.

altGKisPermanent. True or False. Indicates if all subsequent messages are to be redirected to the alternative gatekeepers.

Unregistration Request URQ requestSeqNum. Monotonically increasing number unique to the sender.

callSignalAddress. Call signalling address for the endpoint.

reason. Reason for the unregistration initiated by the gatekeeper.

Unregistration Confirmation (UCF)

requestSeqNum. Same value as for the URQ.

Unregistration Reject (URJ)

requestSeqNum. Same value as for the URQ.

rejectreason. The reason for the rejection of the unregistration.

alternateGatekeeper. Sequence of prioritised alternative gatekeepers with which to retry requests.

altGKisPermanent. True or False. Indicates if all subsequent messages are to be redirected to the alternative gatekeepers.

EXAMPLE 1

Two Endpoints Communicating Directly without a Gatekeeper

In this first example it is assumed that:

the underlying network is an IP network, TCP is used to provide reliable connections and UDP is used to provide unreliable connections;

the two endpoints communicate directly without the use of a gatekeeper—this simplifies the process because the Call Signalling Channel uses a "well-known" TSAP identifier (specified in recommendation H.225); the case where the Call Signalling Channel is identified through an interaction with a gatekeeper is described in Example 2 below;

there are only two endpoints, which initiate one or more audio or video connections using Real Time Protocol (RTP);

the call is not modified during the session, for example by adding new participants or requesting changes in bandwidth;

the Call Signalling Channel remains open for the duration of the session, and a RELEASE COMPLETE message is used to terminate the session.

Figure 14:
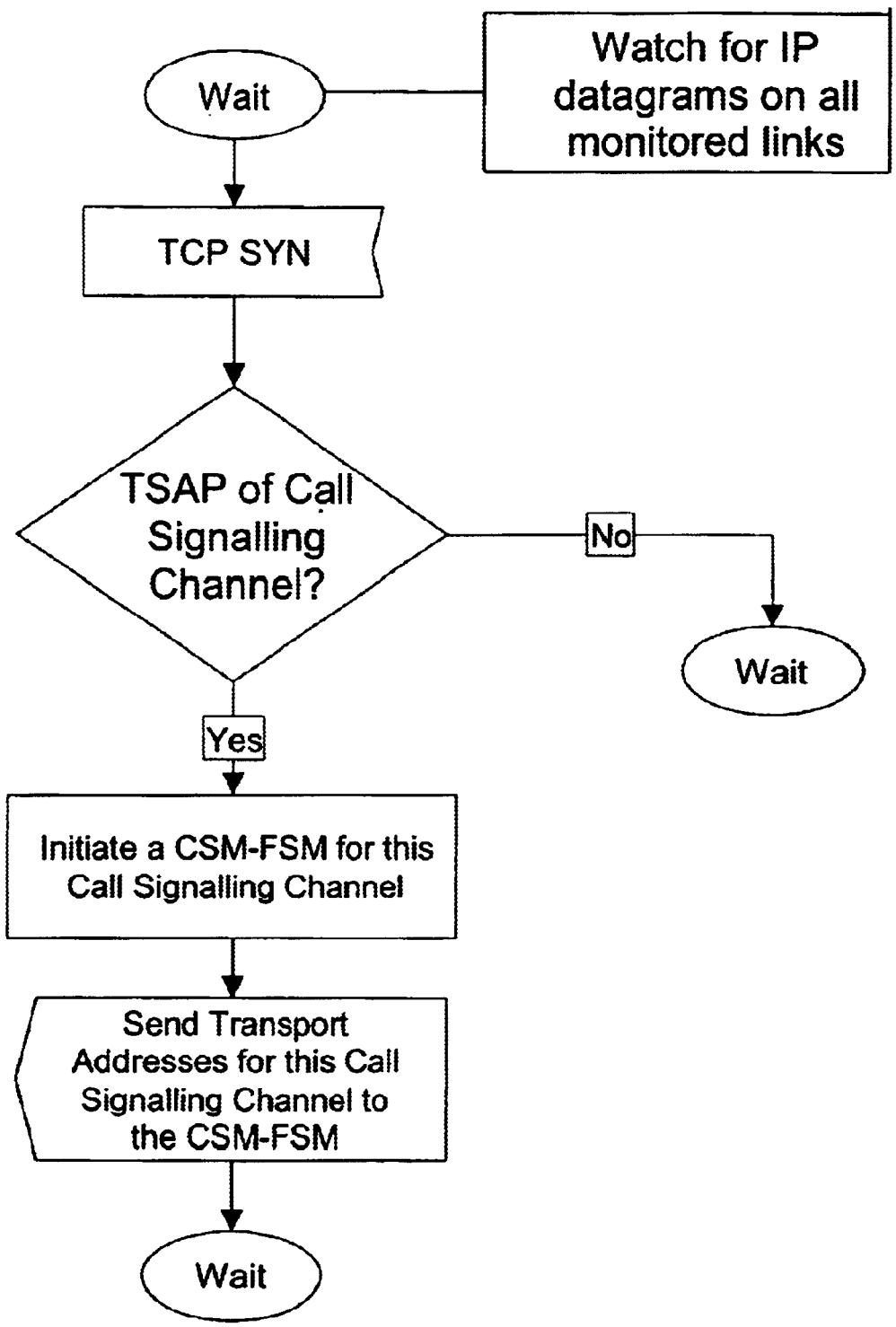
FIG. 14 is a flow diagram of a process for monitoring call signalling channels.

The finite state machine processes required to monitor this type of session are as follows:

1. Call Signalling Channel FSM (see FIG. 14)

This monitors all links continuously looking for a reliable-connection setup (for example, the SYN of a TCP connection) using the well-known TSAP identifier for the Call Signalling Channel. In response to a Call Signalling Channel being established, this process initiates a new Call Signalling Message FSM (CSM-FSM—see item 2 below) to monitor the Channel and passes to it the transport addresses of the two endpoints.

2. Call Signalling Message FSM (see FIG. 15)

This is initiated to monitor a specific Call Signalling Channel, and is terminated when the reliable connection is terminated for that Channel (for example, by the FYN of the TCP connection). It continuously monitors the Channel for signalling messages. A SETUP message indicates the start of a new call, and causes We process to create a new service detail record (SDR) for the call The call identifier is used to uniquely identify the service detail record for the duration of the call, and to identify subsequent call signalling messages. The service detail record is populated with a time stamp, and any useful fields from the SETUP message.

The CONNECT message sent from the called endpoint normally carries the transport addresses to be used for the H.245 Control Channel. In response to this message an H.245 Control Channel FSM (HCC-FSM—see item 3 below) is started, to monitor the H.245 signalling for the session. The service detail record is populated with an additional time stamp if required, and any of the useful fields from the CONNECT message.

A RELEASE COMPLETE message indicates the termination of the session. The service detail record is updated with any relevant data and time stamps, and then closed. The H.245 Control Channel FSM monitoring the H.245 signalling is terminated. However, monitoring for subsequent signalling messages is continued in order to capture further calls between the two endpoints.

Figure 15:
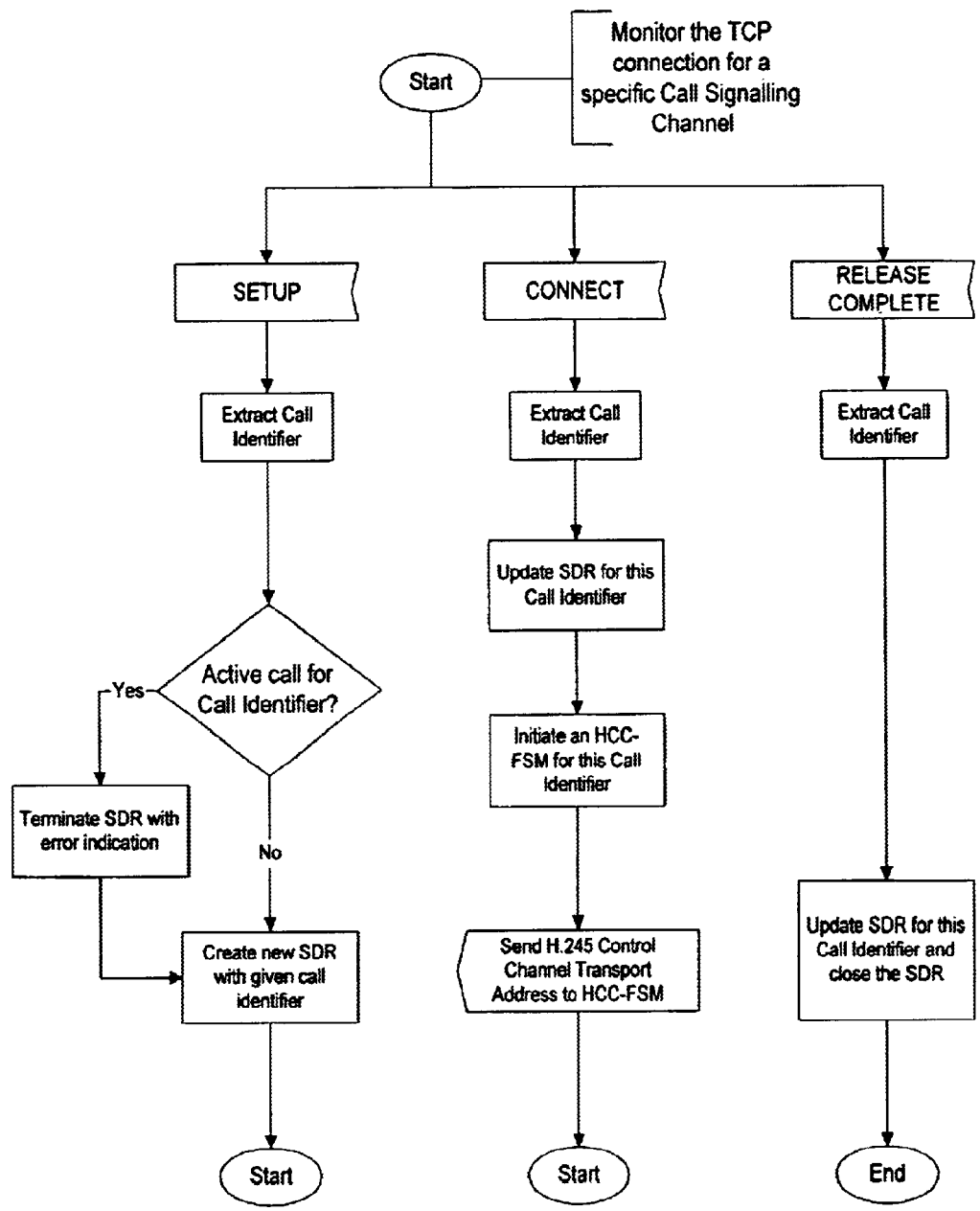
FIG. 15 is a flow diagram of a process for monitoring call signalling messages.

The main paths in this FSM are shown in FIG. 15; however in the interests of clarity error conditions have been omitted. The capture of other signalling messages, particularly those involved in modifying calls, could also be captured and used to update the service detail record with additional information and time stamps. It may also be required to initiate further FSMs to monitor other aspects of the call 3. H.245 Control Channel FSM (see FIG. 16)

This is initiated from the Call Signalling Message FSM and monitors all messages on the H.245 Control Channel for the duration of the call. The FSM is terminated by the detection of an endSessionCommand message on the H.245 Control Channel. Logical channels are opened and closed using the openLogicalChannel and closeLogicalChannel messages. The FSM detects the opening of a Channel, extracts the relevant data and initiates two new FSMs to monitor the forward and reverse Real Time Control Protocol (RTCP) connections (RS-FSMs—see item 4 below). A logical Channel is uniquely identified by the Logical channel Number (LCN). This is used to identify the RS-FSMs to be terminated when the closeLogicalChannel messages are received.

Figure 16:
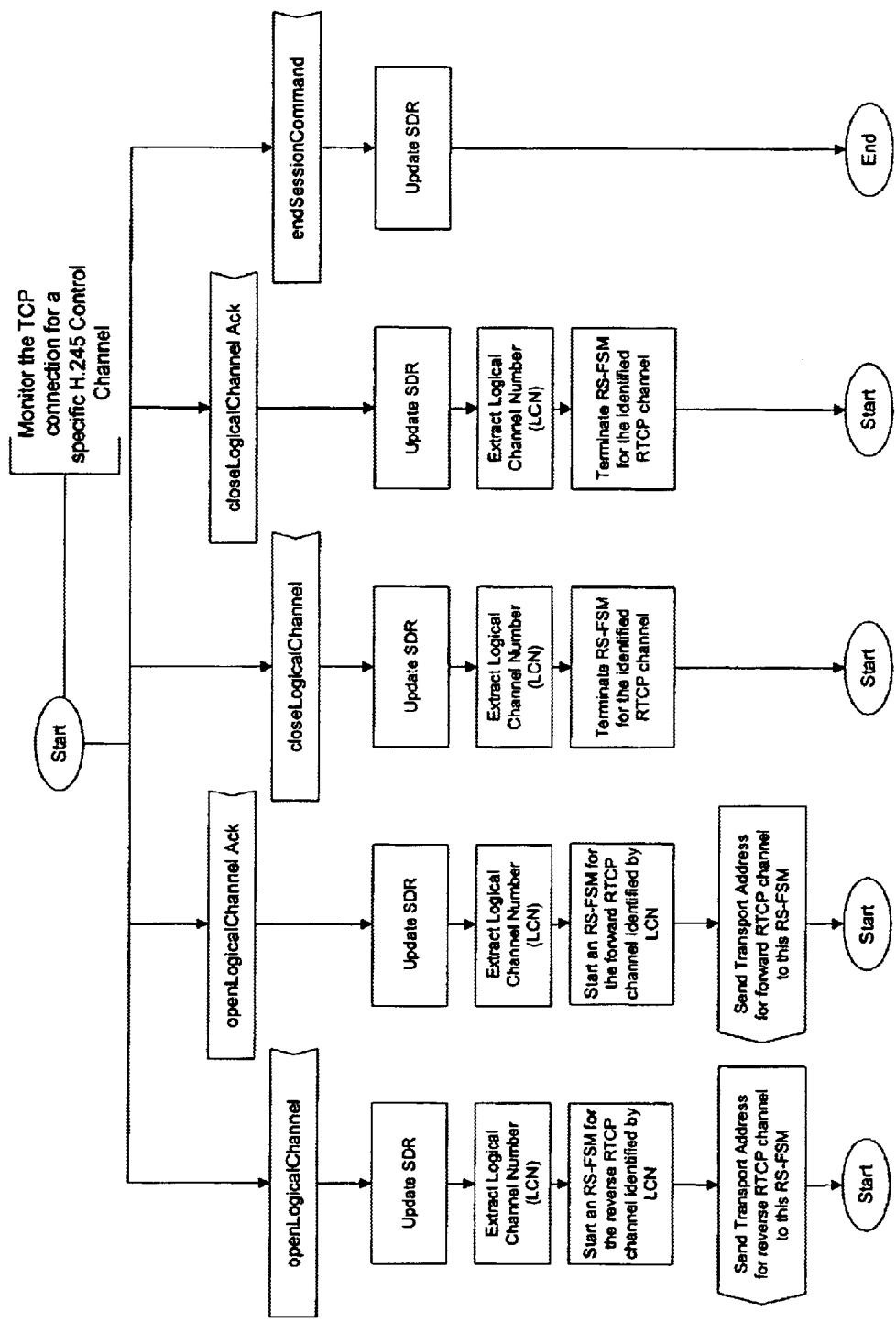
FIG. 16 is a flow diagram of a process for monitoring control channels.

The main process paths are indicated in FIG. 16; however there are many more messages on the Control Channel which could be captured to provide additional information in the service detail record.

4. RTCP Session FSM

The RTCP connection provides detailed information on the performance of the RTP connection that it controls. This can be captured as required to provide quality of service information in the service detail record. The RTP stream itself may be monitored at multiple points in its path to make quality of service measurements which can be added to the service detail record.

EXAMPLE 2

Endpoints Communicating via a Gatekeeper

Figure 17:
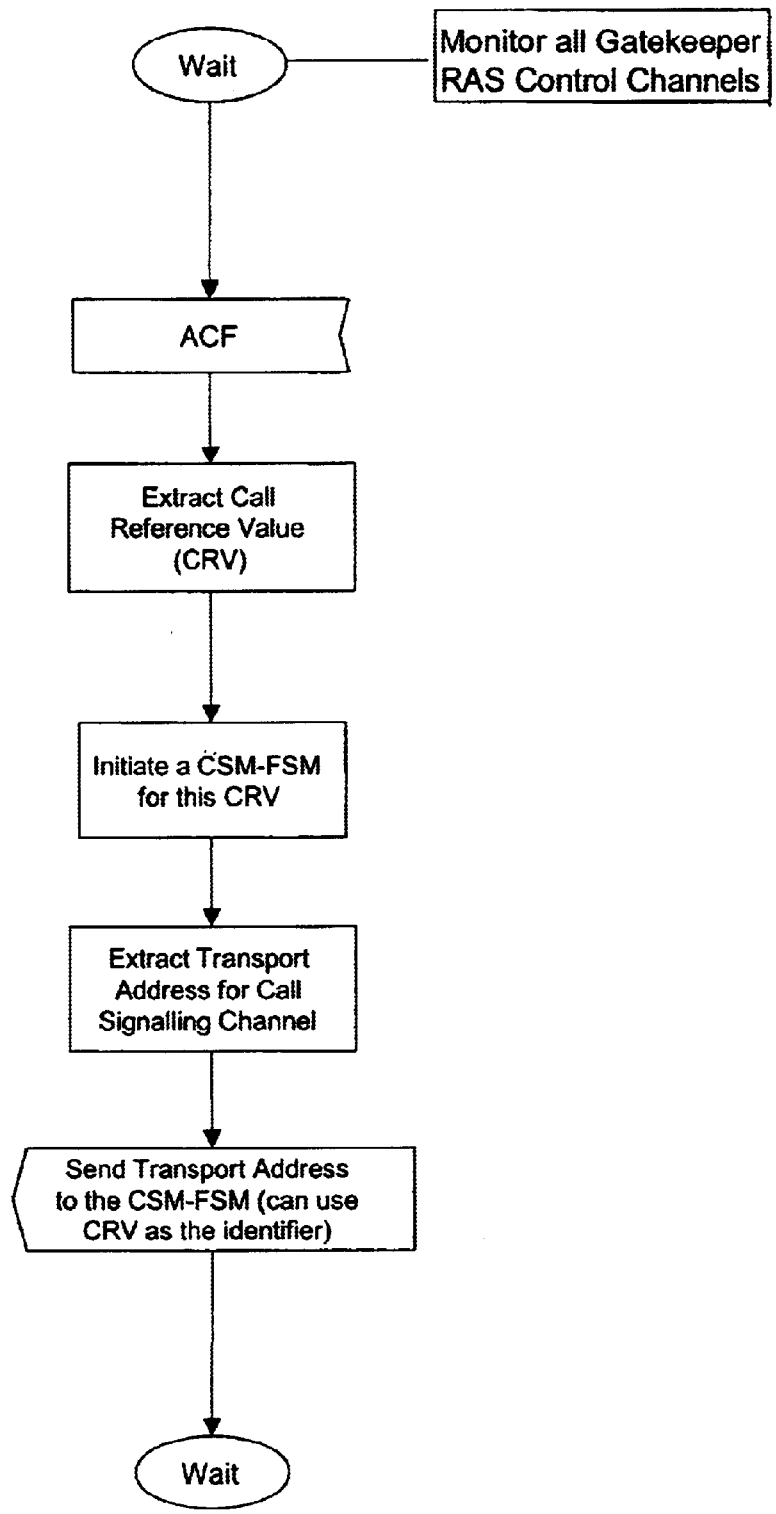
FIG. 17 is a flow diagram of a process for monitoring call signalling channels having dynamic TSAP identifiers.

When a gatekeeper is involved the Call Signalling Channel may no longer be cared on the well-known Transport Address; instead a dynamic TSAP identifier which the endpoint obtains from the gatekeeper may be used. The FSM for this situation is shown in FIG. 17. This process uses the information about gatekeepers and endpoints acquired during the gatekeeper discovery process. The RAS Channel between all gatekeepers and endpoints is continuously monitored for control messages. An Admission Request (ARQ) followed by an Admission Confirmation (ACF) means that the endpoint has requested to setup a call and has been allowed to do so by the gatekeeper. The Transport Address which will be used for the Call Signalling Channel can be obtained from the Admission Confirmation message. A Call Signalling Message FSM is initiated to monitor the reliable connection for that Transport Address. The remainder of the processing proceeds in a similar manner to Example 1.

The example in FIG. 17 shows the generic case of simply identifying the Call Signalling Channel. It is straightforward to extend this to include the creation of the service detail record in response to an Admission Request message from the endpoint to the gatekeeper. This enables the creation of service detail records which include information and time stamps taken from the call related messages on the RAS Channel. It also enables the generation of service detail records in the case where an Admission Reject message is received and no Call Signalling Channel is ever established.

The presence of gatekeepers may also affect the call clearing process. Typically a disengage request (DRQ) message is transferred between the endpoint and the gatekeeper as part of the call clearing process.

The Call Reference Value (CRV), in cases where it is implemented by vendors, can be used throughout the call as a unique identifier for all the messages.

The processes described above can be split in many different ways between the probes and the other processors in the Distributed Management Infrastructure. There are established methods for choosing how to distribute the processing; the Hewlett-Packard acceSS7 architecture provides one example of how this may be achieved.

What is claimed is:

1. A method of generating a service detail record for a communication cared over a packet network in service-providing packets carrying packet network service data, said packet network also carrying signalling packets carrying signalling data, said method comprising:

acquiring signalling data from a signalling packet and identifying from said acquired signalling data at least one of addressing, configuration, status and timing information for endpoints, gatekeepers and connections involved in a call;

controlling acquisition of packet network service data from a service-providing packet, in accordance with information identified from said acquired signalling data; and combining said packet network service data and said signalling data to generate said service detail record.

2. The method of claim 1, wherein some or all of said signalling data and said packet network service data are captured by a passive monitoring system.

3. The method of claim 1, further comprising using said information identified from said signalling data to identify a logical channel car a media stream, and capture data from a packet on said logical channel in real-time at a point in said packet network.

4. The method of claim 3, wherein said captured data are used to measure quality of service achieved by said logical channel.

5. The method of claim 3, wherein said captured data are used to provide secret access to said media stream for troubleshooting or surveillance purposes.

6. The method of claim 5, wherein addressing information for a target user is used to select a correct signalling data packet, potentially in conjunction with data from a network discovery database.

7. The method of claim 1, further comprising correlating data from said packet network with data collected from a switched circuit network to enhance said service detail record.

8. The method of claim 7, including use of data collected from passive monitoring of a signalling network or access signalling.

9. The method of claim 7, including use of data collected from said switched circuit network for audio or video quality.

10. The method of claim 1, further comprising using said service detail record to bill for a service, optionally taking into account quality of service and usage data, and optionally including tracking to see if customers have been exceeding their agreed bandwidth constraints.

11. The method of claim 1, further comprising using said service detail record to detect potentially fraudulent service usage, perform network planning, perform marketing studies, perform network operations functions, modify the network configuration in real-time to achieve quality of service objectives, and/or perform customer care functions.

12. The method of claim 1, wherein said acquiring signalling data and said acquisition of packet network service data are performed at multiple points in real time, and then correlated in real-time.

13. The method of claim 1, wherein said communication comprises real-time voice or audio, fax, voice-messaging, real time video or a multimedia communication.

14. The method of claim 1, wherein said packet network is an IP, frame relay or ATM network.

15. A method of discovering a network configuration of endpoints, gatekeepers and their relationships, for a communication service carried by a packet network, comprising:

passively monitoring signalling messages;

capturing from said monitored signalling messages, signalling messages involved in configuration and negotiation of relationships, addressing and resource allocation, between endpoints and gatekeepers, wherein said captured signalling messages are gatekeeper request, gatekeeper confirmation and gatekeeper reject messages; and extracting data from said captured signalling messages to identify at least one of the following types of information: available gatekeepers, alternative gatekeepers, gatekeepers rejecting request messages, endpoints which receive no response to request messages, and gatekeepers which are excessively slow to respond to requests.

16. A method of discovering a network configuration of endpoints, gatekeepers and their relationships, for a communication service carried by a packet network, comprising:

passively monitoring signalling messages; and capturing from said monitored signalling messages, signalling messages involved in configuration and negotiation of relationships, addressing and resource allocation, between endpoints and gatekeepers, wherein said captured signalling messages are endpoint registration request messages and associated is registration confirmation and reject messages; and extracting data from said captured signalling messages to identify at least one of the following types of information: relationships between gatekeepers and endpoints, correlations between Transport Addresses and Alias addresses, gatekeeper load balance, endpoints receiving no response to request messages, gatekeepers that are excessively slow to respond to requests, correlation between gatekeeper zones and physical network topology, choice by endpoints of gatekeepers with which to register, and rejections of registration requests.

17. A method of generating a service detail record for a communication carried over a packet network in service-providing packets carrying packet network service data, said packet network also carrying signalling packets carrying signalling data, said method comprising:

acquiring signalling data from a signalling packet, said acquired signalling data regarding at least one of call control, registration, admissions, bandwidth management, call status, address translation and intelligent network services;

acquiring packet network service data from a service-providing packet for a communication service;

acquiring quality of service data for said communication service; and combining said packet network service data, said signalling data and said quality of service data to generate said service detail record.

18. The method of claim 17, wherein said acquiring signaling data and said acquiring packet network service data are performed at multiple points in real time, and then correlated in real-time.

19. The method of claim 17, wherein said communication comprises real-time voice or audio, fax, voice-messaging, real time video or a multimedia communication.

20. The method of claim 17, wherein said packet network is an IP, frame relay or ATM network.

21. An apparatus for generating a service detail record for a communication carried over a packet network in service-providing packets carrying packet network service data, said packet network also carrying signalling packets carrying signalling data, said apparatus comprising:

a data acquirer for acquiring signalling data from a signalling packet and for identifying from said acquired signalling data at least one of addressing, configuration, status and timing information for endpoints, gatekeepers and connections involved in a call;

a controller for controlling acquisition of packet network service data from a service-providing packet, in accordance with information identified from said acquired signalling data; and a data combiner for combining said packet network service data and said signalling data to generate said service detail record.

22. An apparatus for generating a service detail record for a communication carried over a packet network in service-providing packets carrying packet network service data, said packet network also carrying signalling packets carrying signalling data, said apparatus comprising:

a first data acquirer for acquiring signalling data from a signalling packet, said acquired signalling data regarding at least one of call control, registration, admissions, bandwidth management, call status, address translation and intelligent network services;

a second data acquirer for acquiring packet network service data from a service-providing packet for a communication service;

a third data acquirer for acquiring quality of service data for said communication service; and a data combiner for combining said packet network service data, said signalling data and said quality of service data to generate said service detail record.

* * * * *